(12) United States Patent
Homsany

(10) Patent No.: US 10,235,504 B2
(45) Date of Patent: *Mar. 19, 2019

(54) FACILITATING ACCESS TO CONTENT FROM GROUP INTERACTIONS

(71) Applicant: DROPBOX INC., San Francisco, CA (US)

(72) Inventor: Ramsey Homsany, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,755

(22) Filed: Mar. 22, 2017

(65) Prior Publication Data

US 2017/0310620 A1    Oct. 26, 2017

Related U.S. Application Data

(63) Continuation of application No. 14/044,191, filed on Oct. 2, 2013, now Pat. No. 9,609,043.

(51) Int. Cl.
| | |
|---|---|
| *G06F 15/16* | (2006.01) |
| *G06F 21/10* | (2013.01) |
| *H04L 29/08* | (2006.01) |
| *H04L 12/28* | (2006.01) |
| *G06Q 10/10* | (2012.01) |
| *G06F 3/042* | (2006.01) |
| *H04L 29/06* | (2006.01) |
| *H04L 12/18* | (2006.01) |
| *H04L 12/58* | (2006.01) |
| *H04N 21/4788* | (2011.01) |

(52) U.S. Cl.
CPC .......... *G06F 21/10* (2013.01); *G06F 3/0421* (2013.01); *G06Q 10/10* (2013.01); *H04L 12/1813* (2013.01); *H04L 12/2861* (2013.01); *H04L 12/2885* (2013.01); *H04L 29/06176* (2013.01); *H04L 51/04* (2013.01); *H04L 63/104* (2013.01); *H04L 65/1089* (2013.01); *H04L 65/601* (2013.01); *H04L 67/06* (2013.01); *H04L 67/28* (2013.01); *H04N 21/4788* (2013.01)

(58) Field of Classification Search
CPC . G06F 21/10; H04L 12/2861; H04L 12/2885; H04N 21/239
See application file for complete search history.

(56) References Cited

U.S. PATENT DOCUMENTS

| | | |
|---|---|---|
| 7,991,853 B2 | 8/2011 | Miyoshi et al. |
| 8,296,360 B2 | 10/2012 | Polis et al. |

(Continued)

OTHER PUBLICATIONS

Papagiannis, Ioannis et al., "Cloud Filter: Practical Control of Sensitive Data Propagation to the Cloud", CCSW 12, Oct. 19, 2012, Raleigh, North Carolina, ACM 978-1-4503-1665, Jan. 12, 2010.

*Primary Examiner* — Kyung H Shin
(74) *Attorney, Agent, or Firm* — DLA Piper LLP US

(57) ABSTRACT

The disclosed embodiments provide a system that facilitates access to content. During operation, the system detects uploading of the content within a group interaction among a set of users. Next, the system aggregates the content into a centralized location. Finally, the system enables access to the content at the centralized location by one or more of the users.

21 Claims, 4 Drawing Sheets

(56) References Cited

U.S. PATENT DOCUMENTS

| | | | |
|---|---|---|---|
| 2009/0248794 A1* | 10/2009 | Helms | H04L 12/2861 |
| | | | 709/203 |
| 2011/0055935 A1* | 3/2011 | Karaoguz | G06F 21/10 |
| | | | 726/29 |
| 2011/0270923 A1 | 11/2011 | Jones et al. | |
| 2012/0072855 A1 | 3/2012 | Deng | |
| 2012/0209909 A1 | 8/2012 | Huang et al. | |
| 2015/0095451 A1 | 4/2015 | Homsany | |

\* cited by examiner

FACILITATING ACCESS TO CONTENT FROM GROUP INTERACTIONS

CROSS-REFERENCE TO RELATED APPLICATIONS

This application claims priority to U.S. application Ser. No. 14/044,191, filed Oct. 2, 2013, also entitled "Facilitating Access To Content From Group Interactions," the content of which is incorporated herein by reference in its entirety.

BACKGROUND

Field

The disclosed embodiments relate to techniques for managing access to content. More specifically, the disclosed embodiments relate to techniques for facilitating access to content from group interactions.

Related Art

Content, such as images, audio, video, and/or documents, is frequently shared within group interactions such as chat sessions, video chat sessions, and/or message threads. For example, a set of users may use a group chat to share pictures from a trip or event with one another. However, accessing and/or storing the content outside of the group interaction may be difficult and/or tedious. For example, a user may not be able to access images posted to a web-based message thread from outside the message thread unless the user manually saves each image from the message thread to a local disk.

Consequently, user experiences with group interactions may be improved by facilitating access to content from the group interactions by users associated with the group interactions.

SUMMARY

The disclosed embodiments provide a system that facilitates access to content. During operation, the system detects uploading of the content within a group interaction among a set of users. Next, the system aggregates the content into a centralized location. Finally, the system enables access to the content at the centralized location by one or more of the users.

In some embodiments, the system also shares the content at the centralized location with other users associated with the one or more of the users.

In some embodiments, access to the content at the centralized location by the one or more of the users and the other users is based on at least one of:
  (i) a relationship of the other users with the one or more of the users;
  (ii) a set of permissions associated with the set of users and the other users; or
  (iii) a set of preferences associated with the set of users and the other users.

In some embodiments, aggregating the content into the centralized location involves at least one of placing the content in the centralized location after the content is uploaded, and aggregating the content into the centralized location after the group interaction has completed.

In some embodiments, enabling access to the content at the centralized location by the one or more of the users involves at least one of providing a link to the centralized location to the one or more of the users, and synchronizing the content between the centralized location and one or more electronic devices of the one or more of the users.

In some embodiments, the centralized location is at least one of a local directory, a remote directory, a shared directory, or an online content management system.

In some embodiments, the group interaction is associated with at least one of a chat session, a message thread, a video chat session, a tag, or a category.

In some embodiments, the content includes at least one of an image, a document, audio, video, or a file.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
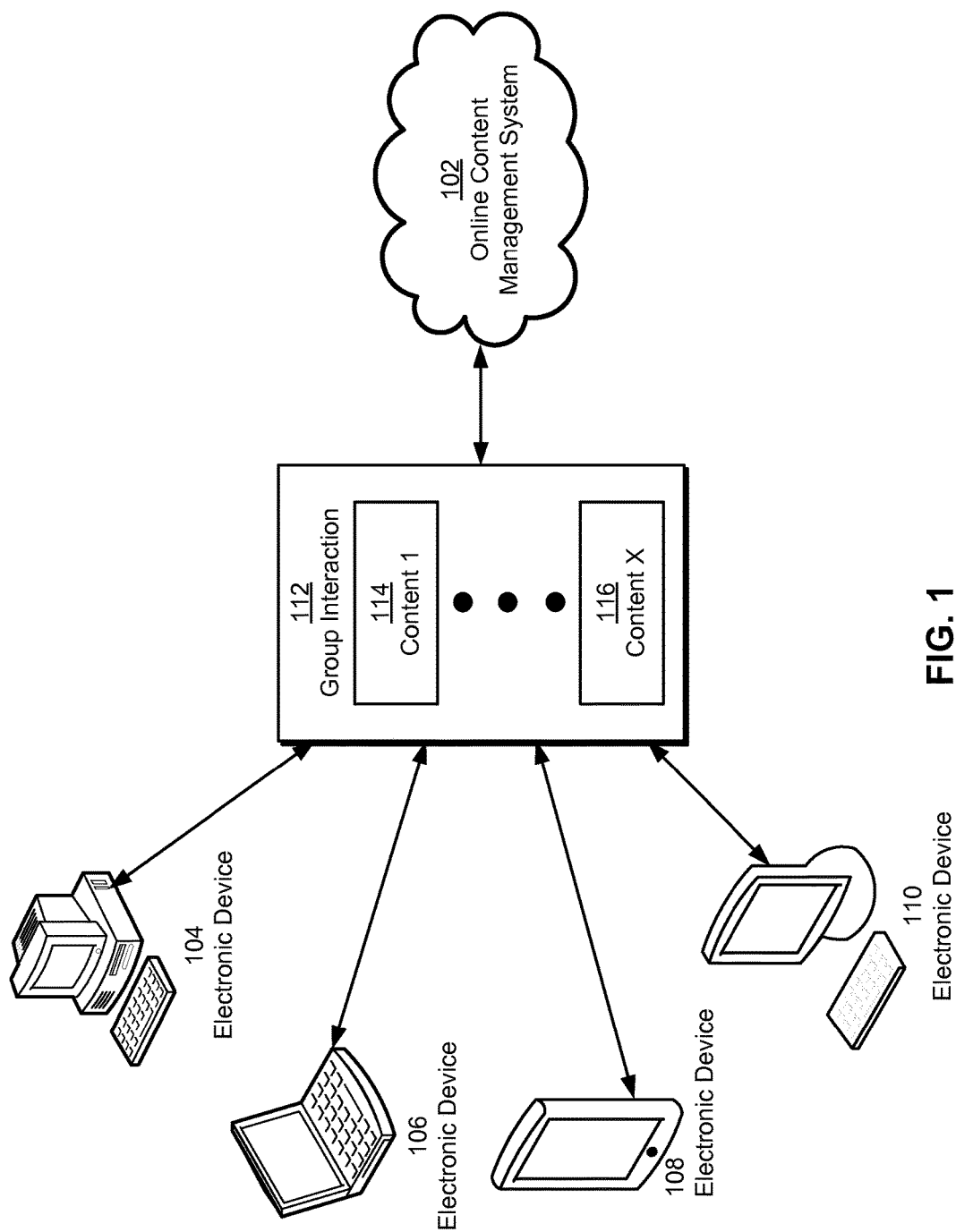
FIG. 1 shows a schematic of a system in accordance with the disclosed embodiments.

The disclosed embodiments provide a method and system for facilitating access to content from group interactions. As shown in FIG. 1, a group interaction 112 may be performed using a set of electronic devices 104-110 such as personal computers, laptop computers, tablet computers, mobile phones, personal digital assistants, portable media players, digital media receivers, and/or other network-enabled electronic devices. In addition, group interaction 112 and/or other communication among electronic devices 104-110 may be enabled by one or more networks, such as a local area network (LAN), wide area network (WAN), personal area network (PAN), virtual private network, intranet, cellular network, WiFi network, Bluetooth (Bluetooth™ is a registered trademark of Bluetooth SIG, Inc.) network, universal serial bus (USB) network, and/or Ethernet network.

During group interaction 112, users of electronic devices 104-110 may transmit communications that are shared among electronic devices 104-110. For example, group interaction 112 may correspond to a chat session, video chat session, message (e.g., text message, microblog, forum post, etc.) thread, content-sharing service, social networking service, and/or other network-based communication mechanism used by electronic devices 104-110. In addition, the users may use group interaction 112 to share content (e.g., content 1 114, content x 116) with one another. For example, one or more users may upload images, audio, video, documents, files, and/or other content to group interaction 112 to share the content with other users participating in group interaction 112.

However, the episodic and/or self-contained nature of group interaction 112 may cause difficulty for the users in accessing and/or managing the content outside of group interaction 112 and/or after group interaction 112 has ended. For example, pictures uploaded to a chat session may be viewed within a website and/or application associated with the chat session. If a user wishes to access the pictures outside the website and/or application, the user may be required to manually select each picture within the website and/or application and save the picture to a local disk on an electronic device (e.g., electronic devices 104-110) used to access the website and/or application. Moreover, the user may have difficulty locating chats and/or pictures transmitted during the chat session within the website and/or application after the chat session has ended.

In one or more embodiments, access to content associated with group interaction 112 is facilitated by an online content management system 102. Online content management system 102 may be used by one or more users of electronic devices 104-110 to perform tasks related to storage, backup, retrieval, sharing, and/or synchronization of data. For example, each user may use an electronic device (e.g., electronic devices 104-110) to store images, audio, video, documents, executables, and/or other files with a user account of the user on online content management system 102.

To enable such storage, backup, sharing, synchronization, and/or access to data on online content management system 102, online content management system 102 may store the data using one or more storage mechanisms. For example, online content management system 102 may use one or more servers, cloud storage, network-attached storage (NAS), a storage area network (SAN), a redundant array of inexpensive disks (RAID) system, and/or other network-accessible storage to store the data. Online content management system 102 may additionally store the data using a variety of filesystem architectures and/or hierarchies and obscure the locations and/or mechanisms involved in storing the data from electronic devices 104-110.

In one or more embodiments, online content management system 102 is associated with a client application that supports automatic data synchronization between electronic devices 104-110 and online content management system 102. For example, the client application may be installed on each electronic device and automatically synchronize changes associated with a designated directory (e.g., new, deleted, modified, copied, and/or moved files and/or subdirectories within the directory) between the electronic device and online content management system 102. To perform such synchronization, the client application may monitor a local directory corresponding to the designated directory on the electronic device and synchronize changes to the local directory with a remote directory corresponding to the designated directory on online content management system 102. Conversely, the client application may identify changes to the remote directory and propagate the changes to the local directory. Because the client application is used directly by a user of the electronic device, the client application may hide and/or omit details of the synchronization from the user.

As discussed in further detail below with respect to FIG. 2, online content management system 102 may aggregate the content from group interaction 112 into a centralized location and manage access to the content at the centralized location by users involved in group interaction 112 and/or other users related to the users. For example, online content management system 102 may copy the content to a shared or remote directory that is accessible from electronic devices 104-110 through a link to the shared or remote directory and/or synchronization of the shared or remote directory with local directories on electronic devices 104-110. As a result, online content management system 102 may simplify and/or streamline access to and/or use of content from group interaction 112 outside of group interaction 112 and/or after group interaction 112 has ended.

Figure 2:
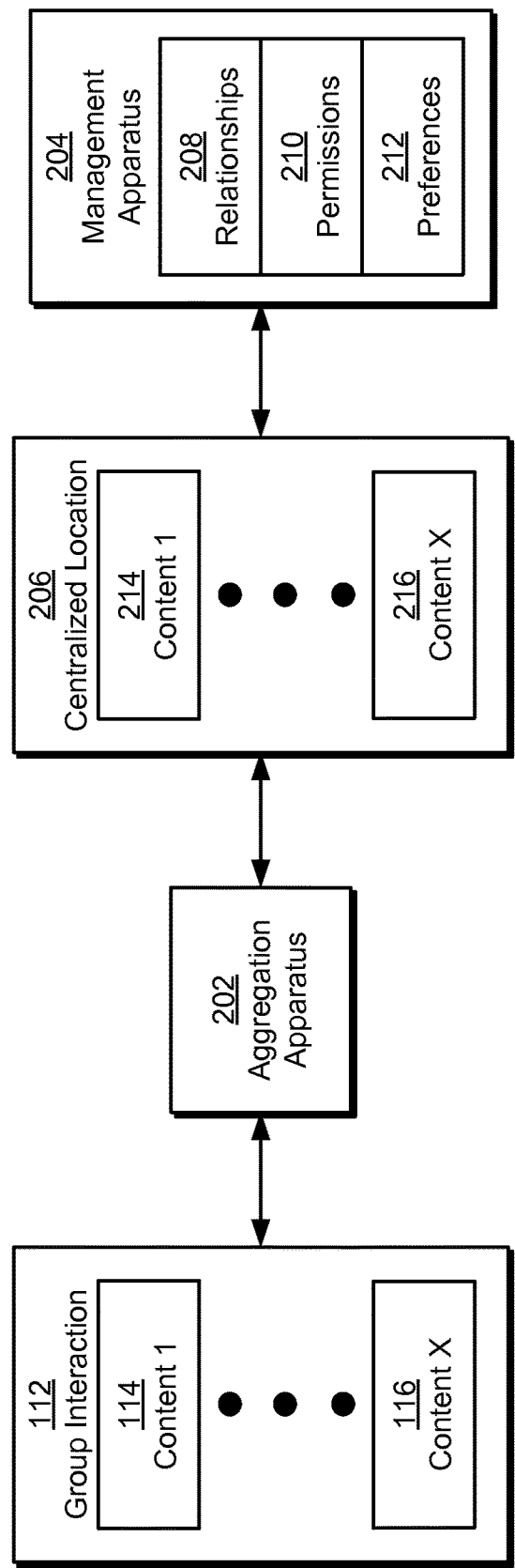
FIG. 2 shows a system for facilitating access to content in accordance with the disclosed embodiments.

FIG. 2 shows a system for facilitating access to content in accordance with the disclosed embodiments. More specifically, FIG. 2 shows a system for facilitating access to content (e.g., content 1 114, content x 116) from group interaction 112 among a set of users. The content may be included in text messages, emails, status updates, posts, microblogs, instant messages, video chats, and/or other communications from the users within group interaction 102. The content and/or group interaction 112 may additionally be associated with a particular subject matter. For example, content and/or communications associated with group interaction 112 may fall under and/or refer to one or more threads, categories, questions, users, and/or tags (e.g., hashtags, metadata tags, etc.).

As shown in FIG. 2, the system may include an aggregation apparatus 202 that detects uploading of the content within group interaction 112 and aggregates the content (e.g., content 1 214, content x 216) into a centralized location 206. For example, aggregation apparatus 202 may include a listener that detects uploads of images, audio, video, documents, files, and/or other content by the users to group interaction 112. Aggregation apparatus 202 may then scrape the content from group interaction 112 and place the content into centralized location 206 after the content is uploaded and/or after group interaction 112 has completed. Alternatively, aggregation apparatus 202 may be integrated into the service and/or application that enables group interaction 112 among the users. In turn, aggregation apparatus 202 may automatically transfer uploaded content within group interaction 112 to centralized location 206 after each piece of content is uploaded and/or in one or more batches.

In addition, centralized location 206 may be associated with a local directory, a remote directory, a shared directory, and/or an online content management system, such as online content management system 102 of FIG. 1. For example, aggregation apparatus 202 may reside on an electronic device of a user participating in group interaction 112 and transfer content from group interaction 112 to a directory on a local disk of the electronic device. On the other hand, aggregation apparatus 202 may be provided by the online content management system and transfer the content to a remote or shared directory within the online content management system.

Aggregation apparatus 202 may use a number of techniques to identify and/or create centralized location 206. For example, aggregation apparatus 202 may create centralized location 206 as a directory within a directory or organizational hierarchy of content uploaded during group interactions associated with one or more users. Aggregation apparatus 202 may also set the name of the directory and/or the position of the directory within the directory or organizational hierarchy based on one or more timestamps associated with group interaction 112; the type of content uploaded within group interaction 112; and/or a title, group name, category, and/or tag associated with group interaction 112.

The system of FIG. 2 may also include a management apparatus 204 that enables access to the content at centralized location 206 by one or more of the users involved in group interaction 112, as well as sharing of the content with other users associated with the user(s). For example, management apparatus 204 may enable access to the content at centralized location 206 by authorized users by providing a link to centralized location 206 to the users and/or synchronizing the content at centralized location 206 with one or more electronic devices, remote directories, and/or shared directories of the users.

Moreover, management apparatus 204 may manage access to content at centralized location 206 based on relationships 208 among the user(s) and/or the other users, a set of permissions 210 associated with the set of users and the other users, and/or a set of preferences 212 associated with the set of users and the other users. For example, management apparatus 204 may include default and/or user-specified settings to automatically allow access to centralized location 206 by one or more participants of group interaction 112. Management apparatus 204 may also allow access to centralized location 206 by one or more types of contacts (e.g., friends, acquaintances, family members, professional contacts, followers, etc.) and/or individual contacts specified by the participant(s). Alternatively, the participant(s) may enable sharing of content in centralized location 206 with other groups and/or on a public basis. Finally, management apparatus 204 may provide and/or filter the content to each authorized user based on the user's preferences 212 associated with aggregation of the content (e.g., as the content is uploaded, after group interaction 112 has finished, etc.), the source of the content (e.g., specific users, types of contacts, etc.), the type of content (e.g., image, audio, video, document, file extension, etc.), and/or tags and/or categories associated with the content.

By enabling access to content from group interaction 112 through centralized location 206, aggregation apparatus 202 and management apparatus 204 may facilitate management and/or use of the content by users related to group interaction 112 outside of group interaction 112 and/or after group interaction 112 has ended. In addition, the management of access to centralized location 206 by management apparatus 204 based on relationships 208, permissions 210, and/or preferences 212 may enable fine-grained control over sharing and/or filtering of the content by the users.

Those skilled in the art will appreciate that the system of FIG. 2 may be implemented in a variety of ways. As mentioned above, the system of FIG. 2 may be provided by an online content management system that stores content from group interaction 112 in one or more remote and/or shared directories. Conversely, one or more components of the system may reside on electronic devices, computer systems, and/or servers used to perform and/or enable group interaction 112.

Along the same lines, aggregation apparatus 202 and management apparatus 204 may be provided by the same software and/or hardware component, or aggregation apparatus 202 and management apparatus 204 may execute independently from one another. For example, aggregation apparatus 202 and/or management apparatus 204 may be implemented by a single physical machine, one or more computer systems and/or electronic devices, a server, a grid, one or more applications, one or more processes, and/or a cloud computing system.

Figure 3:
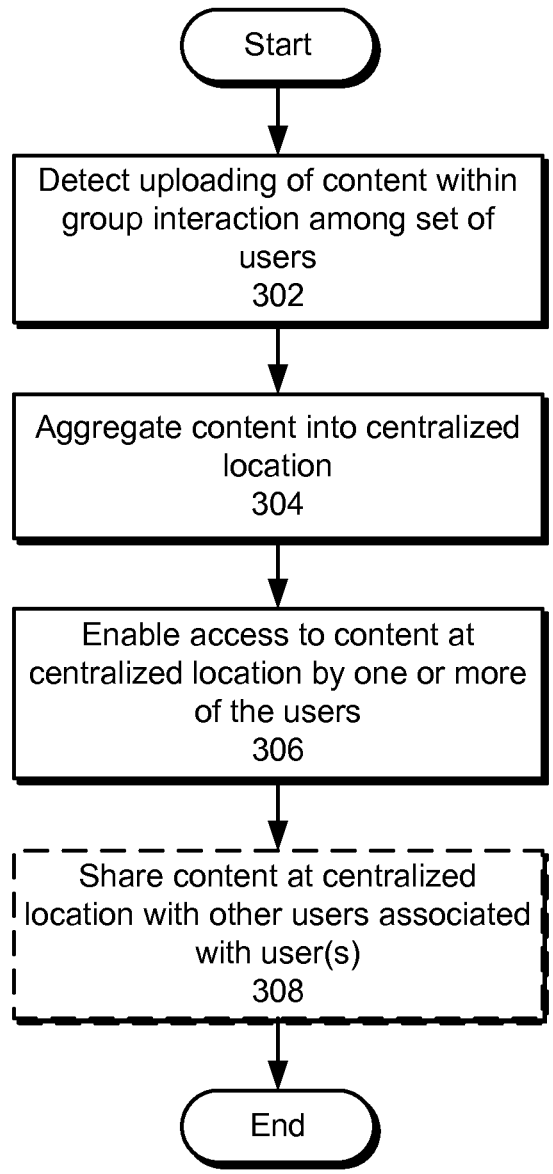
FIG. 3 shows a flowchart illustrating the process of facilitating access to content in accordance with the disclosed embodiments.

FIG. 3 shows a flowchart illustrating the process of facilitating access to content in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, uploading of the content within a group interaction among a set of users is detected (operation 302). The group interaction may be associated with a chat session, a message thread, a video chat session, a tag, and/or a category. The uploaded content may be detected by a listener and/or a component that is integrated within an application and/or service providing the group interaction. Next, the content is aggregated into a centralized location (operation 304) such as a local directory, a remote directory, a shared directory, and/or an online content management system. The content may be placed into the centralized location after the content is uploaded and/or after the group interaction has completed.

Access to the content at the centralized location by one or more of the users is also enabled (operation 306). For example, access to the content at the centralized location may be enabled by providing a link to the centralized location to the user(s) and/or synchronizing the content at the centralized location with one or more electronic devices of the user(s).

Moreover, the content at the centralized location may optionally be shared with other users associated with the user(s) (operation 308). For example, the content at the centralized location may be accessible to the participants of the group interaction by default. In addition, each participant may enable sharing of the content at the centralized location with one or more other users based on the relationship of the other user(s) to the participant. Finally, each user with access to the centralized location may filter and/or sort the content at the centralized location based on one or more preferences of the user with respect to the source of the content, the type of the content, and/or the group interaction. In other words, the users may elect to receive the content from the centralized location through various mechanisms (e.g., through a link and/or local directory) and at different times (e.g., after the content is uploaded, after the group interaction has ended). Each user may also specify a subset of the content to be received (e.g., based on type of content, category, tag, source, group, etc.) and/or opt out of receiving the content at a centralized location.

Figure 4:
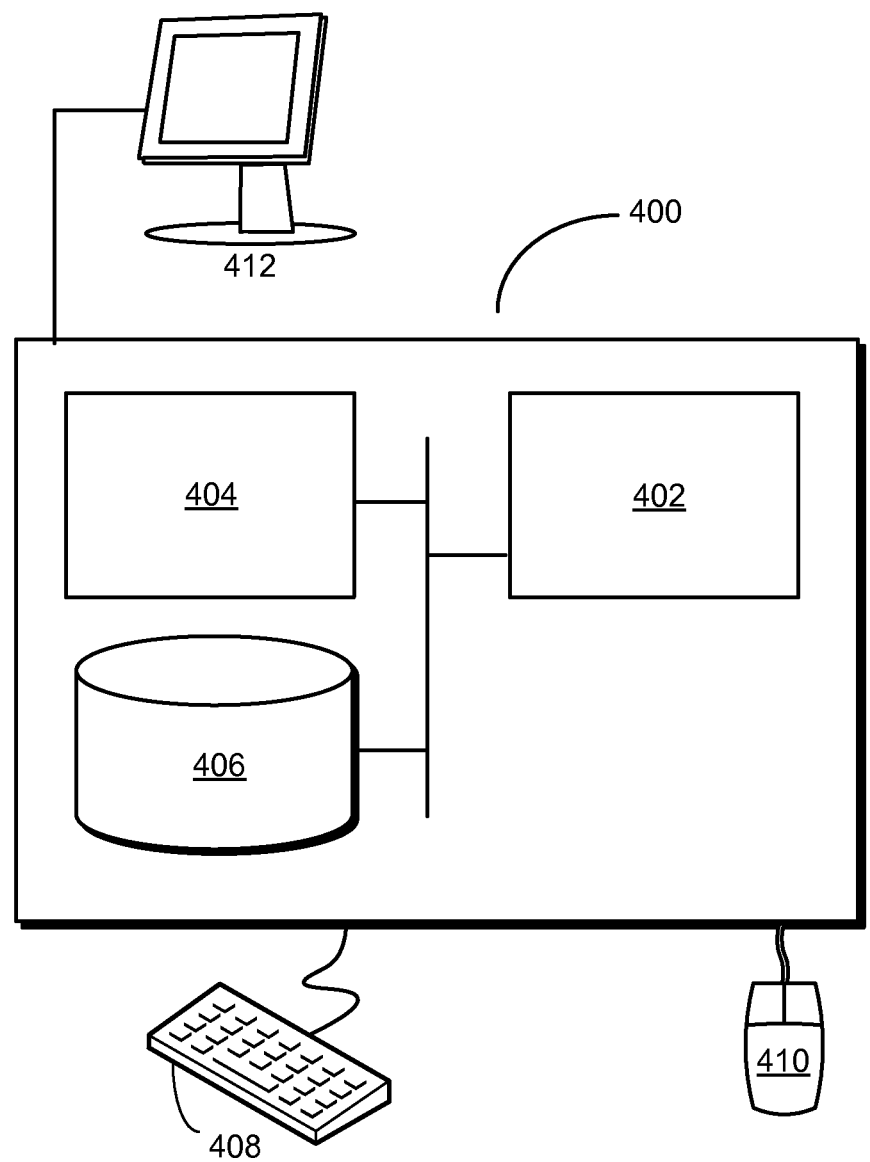
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multithreaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating access to content. The system may include an aggregation apparatus that detects uploading of the content within a group interaction among a set of users and aggregates the content into a centralized location. The system may also include a management apparatus that enables access to the content at the centralized location by one or more of the users and/or shares the content at the centralized location with other users associated with the one or more of the users.

In addition, one or more components of computer system 400 may be remotely located and connected to the other components over a network. Portions of the present embodiments (e.g., aggregation apparatus, management apparatus, etc.) may also be located on different nodes of a distributed system that implements the embodiments. For example, the present embodiments may be implemented using a cloud computing system that aggregates content from group interactions among a set of remote electronic devices and enables access to the content at one or more centralized locations by users of the electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
   detecting uploading of content during a group interaction among a set of users;
   in response to detecting the uploading of the content, automatically determining a first group of users based on the group interaction;
   in response to determining the first group of users, automatically transferring, aggregating and storing the content of the group interaction into a centralized location;
   enabling access to the content at the centralized location by one or more of the users in the first group of users; and
   sharing the content at the centralized location with other users associated with the one or more of the users based on one or more criteria.

2. The method of claim 1, wherein the one or more criteria includes one or more preferences associated with the set of users and the other users.

3. The method of claim 2, wherein the one or more criteria includes filtering the content based on the one or more preferences with respect to a source of the content.

4. The method of claim 2, wherein the one or more criteria includes filtering the content based on the one or more preferences with respect to a type of the content.

5. The method of claim 2, wherein the one or more criteria includes filtering the content based on the one or more preferences with respect to a group interaction.

6. The method of claim 1, wherein the one or more criteria includes a relationship of the other users with the one or more of the users.

7. The method of claim 1, wherein the one or more criteria includes a set of permissions associated with the set of users and the other users.

8. A system comprising:
   one or more processors; and
   a non-transitory computer-readable medium including one or more sequences of instructions that, when executed by one or more processors, causes:
   detecting uploading of content during a group interaction among a set of users;
   in response to detecting the uploading of the content, automatically determining a first group of users based on the group interaction;
   in response to determining the first group of users, automatically transferring, aggregating and storing the content of the group interaction into a centralized location;
   enabling access to the content at the centralized location by one or more of the users in the first group of users; and
   sharing the content at the centralized location with other users associated with the one or more of the users based on one or more criteria.

9. The system of claim 8, wherein the one or more criteria includes one or more preferences associated with the set of users and the other users.

10. The system of claim 9, wherein the one or more criteria includes filtering the content based on the one or more preferences with respect to a source of the content.

11. The system of claim 9, wherein the one or more criteria includes filtering the content based on the one or more preferences with respect to a type of the content.

12. The system of claim 9, wherein the one or more criteria includes filtering the content based on the one or more preferences with respect to a group interaction.

13. The system of claim 8, wherein the one or more criteria includes a relationship of the other users with the one or more of the users.

14. The system of claim 8, wherein the one or more criteria includes a set of permissions associated with the set of users and the other users.

15. A non-transitory computer-readable medium including one or more sequences of instructions that, when executed by one or more processors, causes:
   detecting uploading of content during a group interaction among a set of users;
   in response to detecting the uploading of the content, automatically determining a first group of users based on the group interaction;
   in response to determining the first group of users, automatically transferring, aggregating and storing the content of the group interaction into a centralized location;

enabling access to the content at the centralized location by one or more of the users in the first group of users; and sharing the content at the centralized location with other users associated with the one or more of the users based on one or more criteria.

16. The non-transitory computer-readable medium of claim 15, wherein the one or more criteria includes one or more preferences associated with the set of users and the other users.

17. The non-transitory computer-readable medium of claim 16, wherein the one or more criteria includes filtering the content based on the one or more preferences with respect to a source of the content.

18. The non-transitory computer-readable medium of claim 16, wherein the one or more criteria includes filtering the content based on the one or more preferences with respect to a type of the content.

19. The non-transitory computer-readable medium of claim 16, wherein the one or more criteria includes filtering the content based on the one or more preferences with respect to a group interaction.

20. The non-transitory computer-readable medium of claim 15, wherein the one or more criteria includes a relationship of the other users with the one or more of the users.

21. The non-transitory computer-readable medium of claim 15, wherein the one or more criteria includes a set of permissions associated with the set of users and the other users.

* * * * *